(12) United States Patent
Lee et al.

(10) Patent No.: US 10,270,080 B2
(45) Date of Patent: Apr. 23, 2019

(54) BATTERY PACK

(71) Applicant: Samsung SDI Co., Ltd., Yongin-si, Gyeonggi-do (KR)

(72) Inventors: Haneul Lee, Yongin-si (KR); Jechul Yeoun, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 81 days.

(21) Appl. No.: 15/343,071

(22) Filed: Nov. 3, 2016

(65) Prior Publication Data

US 2017/0125777 A1 May 4, 2017

(30) Foreign Application Priority Data

Nov. 4, 2015 (KR) .......................... 10-2015-0154757

(51) Int. Cl.
*H01M 2/26* (2006.01)
*H01M 2/10* (2006.01)
*H01M 10/42* (2006.01)
*H01M 2/20* (2006.01)

(52) U.S. Cl.
CPC ............ *H01M 2/26* (2013.01); *H01M 2/105* (2013.01); *H01M 2/1077* (2013.01); *H01M 2/206* (2013.01); *H01M 10/4257* (2013.01); *H01M 2010/4271* (2013.01)

(58) Field of Classification Search
CPC .......... H01M 2/26; H01M 2/10; H01M 2/105; H01M 2/1077; H01M 10/42; H01M 10/4257
See application file for complete search history.

(56) References Cited

U.S. PATENT DOCUMENTS

| 2013/0059484 A1* | 3/2013 | Kang ................... H01R 13/113 439/754 |
| 2013/0143075 A1* | 6/2013 | Yi ........................ H01M 2/1055 429/7 |
| 2014/0162161 A1 | 6/2014 | Hood | |

FOREIGN PATENT DOCUMENTS

| KR | 10-1998-0059855 A | 11/1998 |
| KR | 10-2014-0005194 A | 1/2014 |
| KR | 10-2016-0139807 A | 12/2016 |

* cited by examiner

*Primary Examiner* — Karie O'Neill Apicella
(74) *Attorney, Agent, or Firm* — Knobbe Martens Olson & Bear LLP

(57) ABSTRACT

A battery pack is disclosed. In one aspect, the battery pack includes a plurality of battery cells, a plurality of connection tabs electrically connected to the battery cells, and a circuit board having a plurality of connection holes respectively configured to receive the connection tabs. The connection holes include a plurality of first connection holes formed at first positions and each having a first width and a plurality of second connection holes formed at second positions and each having a second width greater than the first width.

20 Claims, 6 Drawing Sheets

BATTERY PACK

CROSS-REFERENCE TO RELATED APPLICATION

This application claims the benefit of Korean Patent Application No. 10-2015-0154757, filed on Nov. 4, 2015, in the Korean Intellectual Property Office, the disclosure of which is incorporated herein in its entirety by reference.

BACKGROUND

Field

The described technology generally relates to a battery pack.

Description of the Related Technology

In general, secondary (rechargeable) batteries refer to batteries that can be repeatedly charged and discharged, unlike primary batteries that cannot be recharged. Secondary batteries are used as energy sources for mobile devices, electric vehicles, hybrid vehicles, electric bicycles, and uninterruptible power supplies. They can be configured as single batteries or as battery packs in which multiple batteries are assembled and electrically connected as one unit.

While a small mobile device such as a cell phone can operate for a predetermined period of time by using an output and a capacity of a single battery, in high-power consumption applications such as an electric or hybrid vehicle (which has to operate long periods and requires high power) a battery pack is used to ensure sufficient power output and capacity. Output voltage or current can be increased according to the number of batteries included in the pack.

SUMMARY OF CERTAIN INVENTIVE ASPECTS

One inventive aspect relates to a battery pack that can easily connect connection tabs for electrically connecting battery cells and a circuit board.

Another aspect is a battery pack that can stably support a circuit board for controlling charging and discharging of battery cells.

Another aspect is a battery pack that includes: battery cells; and connection holes into which connection tabs electrically connected to the battery cells are inserted, wherein the connection holes include first connection holes formed at first positions and having large widths and second connection holes formed at second positions and having small widths.

For example, the battery cells includes battery cells in first and second rows that are arranged to have a facing direction in which the battery cells in the first and second rows face each other as a longitudinal direction.

For example, a circuit board is disposed at a central position in a facing direction in which battery cells in first and second rows face each other.

For example, the connection tabs are formed at a central position in a facing direction in which battery cells in first and second rows face each other.

For example, the connection tabs are disposed closer to electrodes that face each other than electrodes that are far from each other among electrodes of the battery cells in the first and second rows in the facing direction.

For example, the connection tabs are bent upward from main bodies of connection members electrically connected to battery cells in first and second rows toward a circuit board.

For example, the connection tabs move from the first connection holes formed at the first positions to the second connection holes formed at the second positions as a circuit board slides.

For example, connection pads soldered to the connection tabs are formed around the second connection holes.

For example, the battery cells include: battery cells in a first row and battery cells in a second row that are arranged to have a facing direction in which the battery cells in the first and second rows face each other as a longitudinal direction; and battery cells in a third row having a direction perpendicular to the facing direction as a longitudinal direction.

The connection tabs can include first through third connection tabs electrically connected to the battery cells in the first through third rows, wherein the first through third connection tabs move from the first connection holes formed at the first positions to the second connection holes formed at the second positions as a circuit board slides.

Another aspect is a battery pack that includes: battery cells in first and second rows arranged to have a facing direction in which the battery cells in the first and second rows face each other as a longitudinal direction; a circuit board configured to obtain state information from the battery cells in the first and second rows; and connection tabs electrically connected to the battery cells in the first and second rows and inserted into the circuit board, wherein the connection tabs are formed at a central position of the battery cells in the first and second rows in the facing direction.

For example, the connection tabs are disposed closer to electrodes that face each other than electrodes that are far from each other among electrodes of the battery cells in the first and second rows.

For example, the connection tabs are bent upward from main bodies of connection members electrically connected to the battery cells in the first and second rows toward the circuit board.

For example, the circuit board is disposed at a central position in the facing direction of the battery cells in the first and second rows.

For example, connection holes into which the connection tabs are inserted are formed in the circuit board, wherein the connection holes include first connection holes formed at first positions and having large widths and second connection holes formed at second positions and having small widths.

For example, the connection tabs move from the first connection holes formed at the first positions to the second connection holes formed at the second positions as the circuit board slides.

For example, connection pads soldered to the connection tabs are formed around the second connection holes.

For example, the battery pack further includes battery cells in a third row having a direction perpendicular to the facing direction as a longitudinal direction.

Another aspect is a battery pack comprising: a plurality of battery cells; a plurality of connection tabs electrically connected to the battery cells; and a circuit board having a plurality of connection holes respectively configured to receive the connection tabs, wherein the connection holes comprise a plurality of first connection holes formed at first positions and each having a first width and a plurality of second connection holes formed at second positions and each having a second width greater than the first width.

In the above battery pack, the battery cells comprise battery cells in first and second rows that are arranged to have a facing direction in which the battery cells in the first and second rows face each other as a longitudinal direction.

In the above battery pack, wherein the circuit board is disposed at a central position in a facing direction in which battery cells in first and second rows face each other.

In the above battery pack, wherein the connection tabs are formed at a central position in a facing direction in which battery cells in first and second rows face each other.

In the above battery pack, the connection tabs are arranged closer to electrodes of the battery cells that face each other than electrodes of the battery cells that do not face each other.

The above battery pack further comprises a plurality of connection members connected to the connection tabs and electrically connected to the battery cells, wherein the connection tabs are bent upward from the connection members.

In the above battery pack, the connection tabs are configured to move from the first connection holes formed at the first positions to the second connection holes formed at the second positions.

The above battery pack further comprises a plurality of connection pads formed around the second connection holes.

In the above battery pack, the battery cells comprise: a plurality of first battery cells in a first row and a plurality of second battery cells in a second row, wherein the first battery cells face the second battery cells; and a plurality of third battery cells in a third row arranged in a direction crossing the direction in which the first and second battery cells are arranged.

In the above battery pack, the circuit board is configured to slide, wherein the connection tabs comprise first through third connection tabs electrically connected to the battery cells in the first through third rows, wherein the first through third connection tabs are configured to move from the first connection holes to the second connection holes as the circuit board slides.

Another aspect is a battery pack comprising: a plurality of battery cells in first and second rows arranged to face each other; a circuit board configured to obtain state information from the battery cells; and a plurality of connection tabs electrically connected to the battery cells in the first and second rows and inserted into the circuit board, wherein the connection tabs are formed closer to the center of the rows of batteries than edges of the rows of batteries.

In the above battery pack, the connection tabs are arranged closer to electrodes of the battery cells that face each other than electrodes of the battery cells that do not face each other.

The above battery pack further comprises a plurality of connection members connected to the connection tabs and electrically connected to the battery cells, wherein the connection tabs are bent upward from the connection members.

In the above battery pack, the circuit board is disposed at a central position in the facing direction of the battery cells in the first and second rows.

In the above battery pack, the circuit board has a plurality of connection holes into which the connection tabs are inserted, wherein the connection holes comprise a plurality of first connection holes formed at first positions and each having a first width and a plurality of second connection holes formed at second positions and having a second width that is less than the first width.

In the above battery pack, the connection tabs are configured to move from the first connection holes formed at the first positions to the second connection holes formed at the second positions.

The above battery pack further comprises a plurality of connection pads formed around the second connection holes.

The above battery pack further comprises a plurality of battery cells in a third row arranged in a direction crossing the direction in which the first and second battery cells are arranged.

Another aspect is a battery pack comprising: a plurality of battery cells arranged in first to third groups, wherein the battery cells of the first and second groups extend in a first direction, and wherein the battery cells of the third group extend in a second direction crossing the first direction; a plurality of connection tabs electrically connected to the battery cells; and a circuit board having a plurality of connection holes and placed over the first to third groups of the battery cells, wherein the connection holes are substantially linear and extend in the second direction, wherein the connection tabs are inserted into the connection holes, and wherein at least two of the connection holes have different widths.

In the above battery pack, the battery cells of the first and second groups respectively comprise a plurality of first electrodes and a plurality of second electrodes, wherein the first electrodes face the second electrodes, wherein the battery cells of the first and second groups respectively comprise a plurality of third electrodes and a plurality of fourth electrodes, wherein the third and fourth electrodes do not face each other, and wherein the connection tabs are located closer to the first and second electrodes than the third and fourth electrodes.

DETAILED DESCRIPTION OF CERTAIN INVENTIVE EMBODIMENTS

Reference will now be made in detail to exemplary embodiments, examples of which are illustrated in the accompanying drawings. As used herein, the term "and/or" includes any and all combinations of one or more of the associated listed items. Expressions such as "at least one of" when preceding a list of elements, modify the entire list of elements and do not modify the individual elements of the list. In this disclosure, the term "substantially" includes the meanings of completely, almost completely or to any significant degree under some applications and in accordance with those skilled in the art. Moreover, "formed, disposed or positioned over" can also mean "formed, disposed or positioned on." The term "connected" includes an electrical connection.

Figure 1:
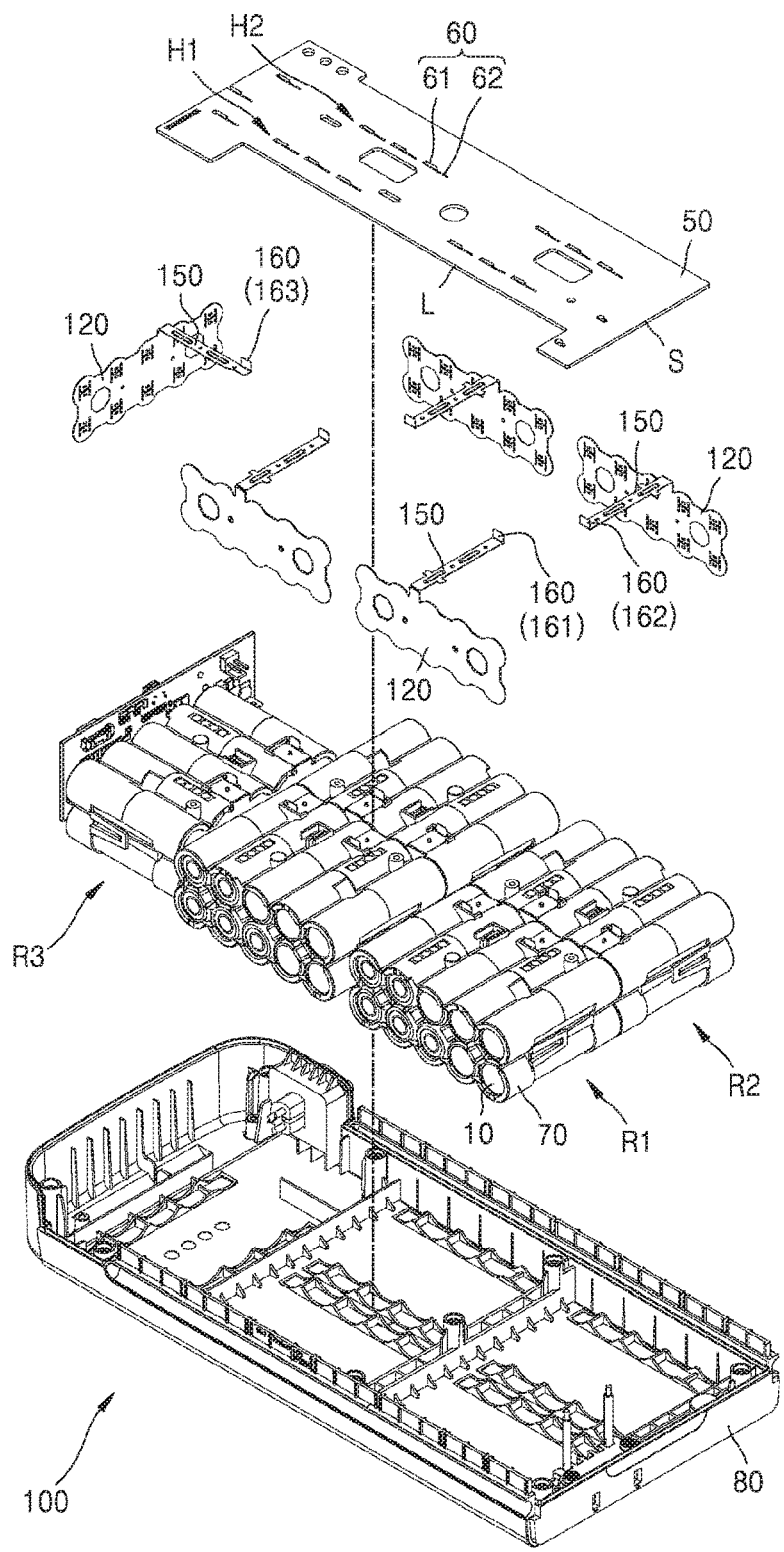
FIG. 1 is an exploded perspective view of a battery pack according to an exemplary embodiment.
Figure 2:
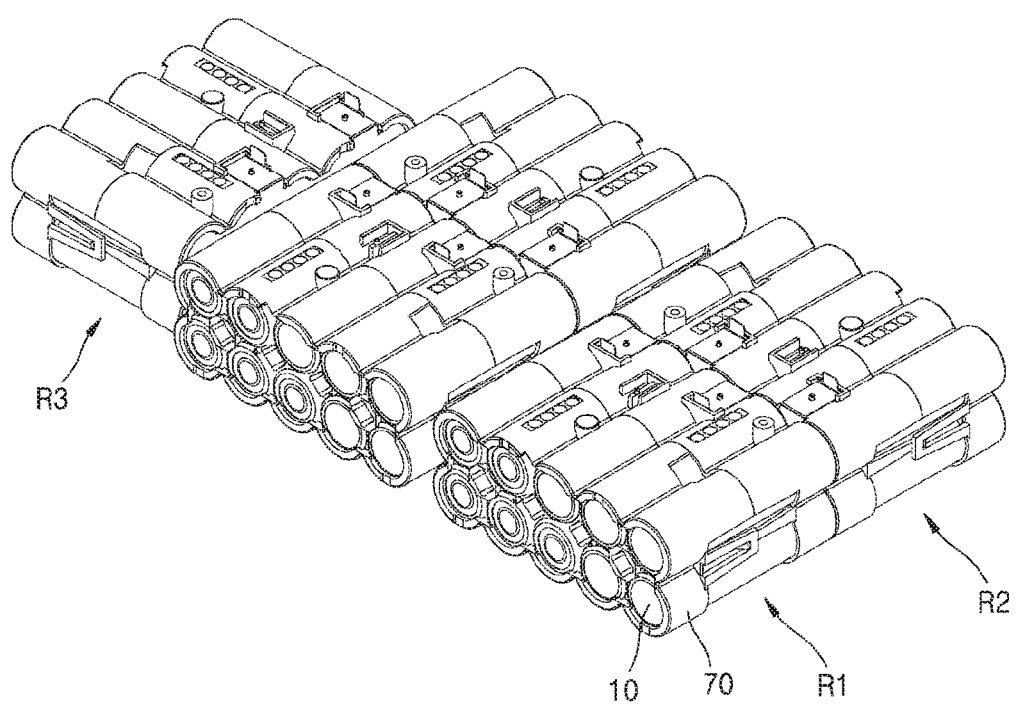
FIG. 2 is a perspective view illustrating an arrangement of battery cells of FIG. 1.
Figure 3:
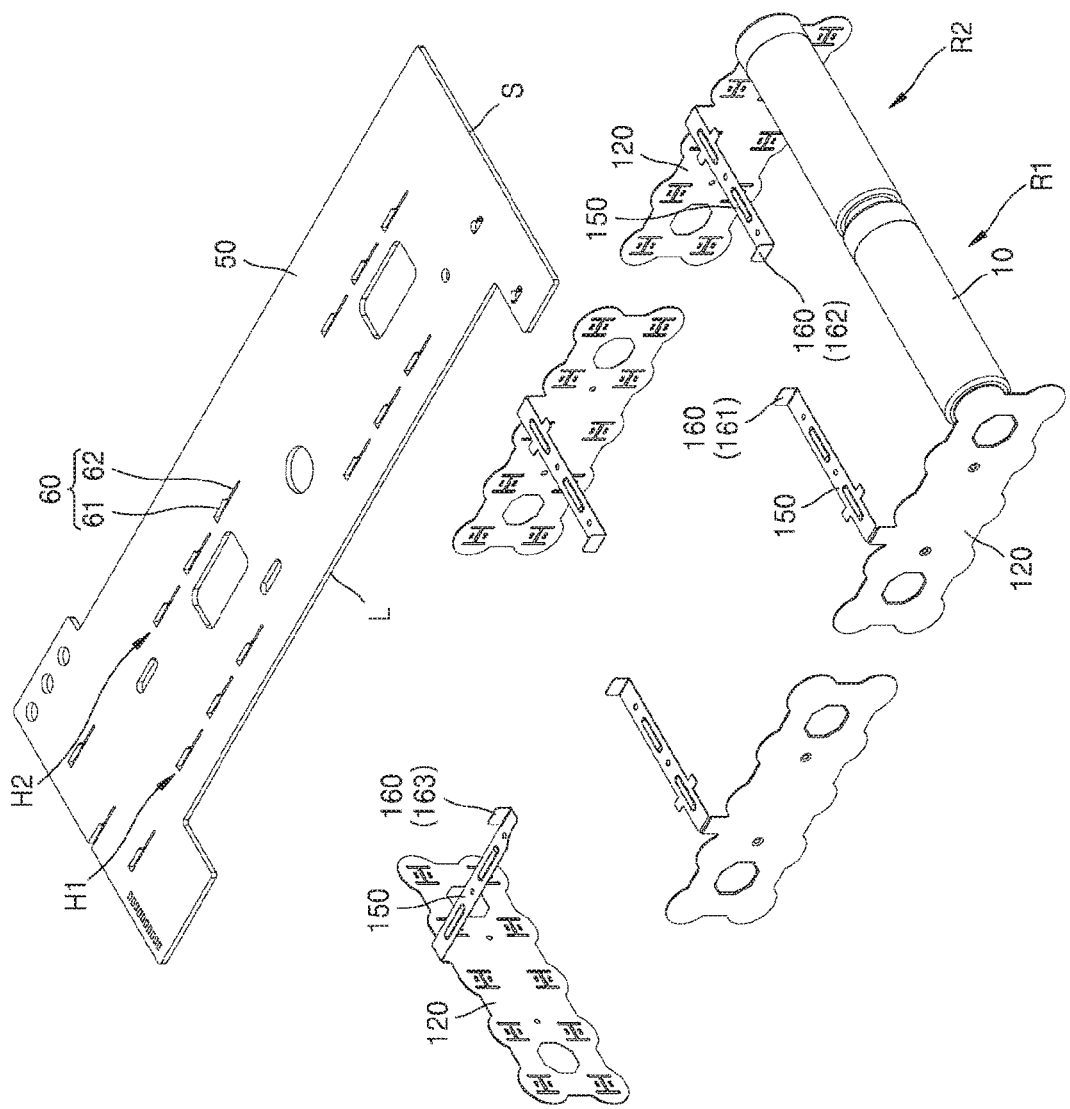
FIG. 3 is an exploded perspective view illustrating some elements of FIG. 1.

FIG. 1 is an exploded perspective view of a battery pack 100 according to an exemplary embodiment. FIG. 2 is a perspective view illustrating an arrangement of battery cells 10 of FIG. 1. FIG. 3 is an exploded perspective view illustrating some elements of FIG. 1.

Referring to FIGS. 1 through 3, the battery pack 100 includes two or more battery cells 10, link members 120 for electrically connecting the battery cells 10, and connection members 150 extending from the link members 120 and configured to transmit state information of the battery cells 10 to a circuit board 50. The link members 120 and the connection members 150 can be arranged to cross each other, for example, substantially perpendicular to each other.

The battery pack 100 can include the battery cells 10 arranged in a first row R1 and a second row R2. For example, the battery cells 10 in the first row R1 and the second row R2 are arranged to have a facing direction in which the battery cells 10 in the first and second rows R1 and R2 face each other as a longitudinal direction of the battery cells 10 in the first and second rows R1 and R2. For example, the battery cells 10 in the first and second rows R1 and R2 are arranged in parallel in the facing direction, and can have the facing direction as the longitudinal direction. The battery pack 100 can further include the battery cells 10 in a third row R3 arranged to have a direction different from the facing direction of the battery cells 10 in the first and second rows R1 and R2 as a longitudinal direction of the battery cells 10 in the third row R3, which will be explained below in detail.

The battery cells 10 can be accommodated in a holder 70. For example, the holder 70 provides a space in which the battery cells 10 are accommodated and that conforms to cylindrical shapes of the battery cells 10. The holder 70 can isolate the battery cells 10 from one another, and can be formed to expose electrodes formed at both ends in the longitudinal direction of the battery cells 10 and to cover cylindrical side surfaces. The holder 70 can be received in a case 80. Although not shown in FIGS. 1 through 3, a cover (not shown) can be disposed on the case 80, and the case 80 and the cover can be assembled to face each other with the holder 70 and the circuit board 50 therebetween.

The battery cells 10 in the first and second rows R1 and R2 can be electrically connected through the link members 120. For example, the battery cells 10 in the first and second rows R1 and R2 are electrically connected in series, in parallel, or in series-parallel through the link members 120. For example, each of the link members 120 connects adjacent battery cells 10 in parallel by connecting same poles of the adjacent battery cells 10, or connects adjacent battery cells 10 in series by connecting different poles of the adjacent battery cells 10.

The connection members 150 can extend from the link members 120. The battery cells 10 that are connected to each other by the link members 120 can be electrically connected to the circuit board 50 through the connection members 150, and can transmit state information of the battery cells 10 to the circuit board 50 through the connection members 150. The connection members 150 transmit state information such as a voltage of the battery cells 10 to the circuit board 150.

The circuit board 50 for controlling charging/discharging of the battery cells 10 can obtain state information such as a voltage or a temperature and can control charging/discharging of the battery cells 10 based on the obtained state information. The connection members 150 can extend to a central position from the link members 120 disposed on both ends in the longitudinal direction of the battery cells 10 (e.g., the facing direction of the battery cells 10 in the first and second rows R1 and R2). Connection tabs 160 inserted into the circuit board 50 can be formed on ends of the connection members 150. As described below, the connection tabs 160 of the connection members 150 can be inserted into connection holes 60 of the circuit board 50. The connection tabs 160 can include first connection tabs 161 electrically connected to the battery cells 10 in the first row R1 and second connection tabs 162 electrically connected to the battery cells 10 in the second row R2.

The circuit board 50 can include a controller for controlling charging/discharging of the battery cells 10 or can include at least a part of the controller. The connection holes 60 into which the connection tabs 160 electrically connected to the battery cells 10 are inserted can be formed in the circuit board 50. The connection holes 60 can include first connection holes 61 and second connection holes 62 that are formed in one direction and have different widths. As described below, the one direction in which the first and second connection holes 61 and 62 are formed can correspond to a sliding direction (see the arrow in FIG. 4) in which the circuit board 50 slides. Connection pads (not shown) to be electrically connected to the connection tabs 160 inserted into the connection holes 60 can be formed around the connection holes 60.

The first connection holes 61 can have widths that are larger than those of the second connection holes 62. The larger widths of the first connection holes 61 allow for the connection tabs 160 to be easily inserted thereinto. The second connection holes 62 can be used to fix the connection tabs 160 inserted into the first connection holes 61.

The first and second connection holes 61 and 62 can be formed in one direction. The one direction can be the sliding direction of the circuit board 50. The first and second connection holes 61 and 62 can be connected to each other. For example, the first and second connection holes 61 and 62 for accommodating the connection tabs 160 as the circuit board 50 slides are connected to each other.

The connection tabs 160 can be formed on ends of the connection members 150, and can transmit state information, for example, a voltage signal, of the battery cells 10 electrically connected to the connection members 150 to the circuit board 50. The connection tabs 160 can extend upward from main bodies of the connection members 150 to the circuit board 50. The connection tabs 160 can be bent upward from the main bodies of the connection members 150 to extend to the circuit board 50.

Although not shown in FIGS. 1 through 3, connection pads (not shown) to be electrically connected to the connection tabs 160 can be formed around the connection holes 60. For example, the connection pads can be formed around the connection holes 60, especially around the second connection holes 62 to which the connection tabs 160 are fixed. The connection pads can be connected to conductive patterns (not shown) formed on the circuit board 50, and state information of the battery cells 10 can be transmitted through the connection tabs 160, the connection pads, and the conductive patterns to the circuit board 50.

The connection holes 60 can be formed in the circuit board 50 in a first row H1 and a second row H2 that are different from each other. The first connection tabs 161 electrically connected to the battery cells 10 in the first row R1 can be inserted into the connection holes 60 in the first row H1 and the second connection tabs 162 electrically connected to the battery cells in the second row H2 can be inserted into the connection holes 60 in the second row R2.

The connection holes 60 can be formed at a central position of the circuit board 50. For example, the connection holes 60 include connection holes in the first row H1 and connection holes in the second row H2 that are parallel to each other, and the connection holes 60 in the first and second rows H1 and H2 can be formed at a central position of the circuit board 50.

The connection holes 60 can be formed at a central position in the longitudinal direction of the battery cells 10 in the first and second rows R1 and R2 (i.e., the facing direction of the battery cells 10 in the first and second rows R1 and R2). For example, the battery cells 10 in the first and second rows R1 and R2 can be formed to have a facing direction as a longitudinal direction, and the connection holes 60 can be formed at a central position in the longitudinal direction of the battery cells 10 in the first and second rows R1 and R2. For example, when the battery cells 10 include electrodes having different polarities at both ends in the longitudinal direction (i.e., the facing direction of the battery cells 10 in the first and second rows R1 and R2), the connection holes 60 are formed at a central position closer to electrodes that face each other, than electrodes that are far from each other, among the electrodes of the battery cells 10 in the first and second rows R1 and R2.

The circuit board 50 can be disposed on the battery cells 10 in the first and second rows R1 and R2. For example, the circuit board 50 is disposed at a central position of the battery cells 10 in the first and second rows R1 and R2. For example, the circuit board 50 is disposed at a central position in the longitudinal direction of the battery cells 10 in the first and second rows R1 and R2.

Figure 4:
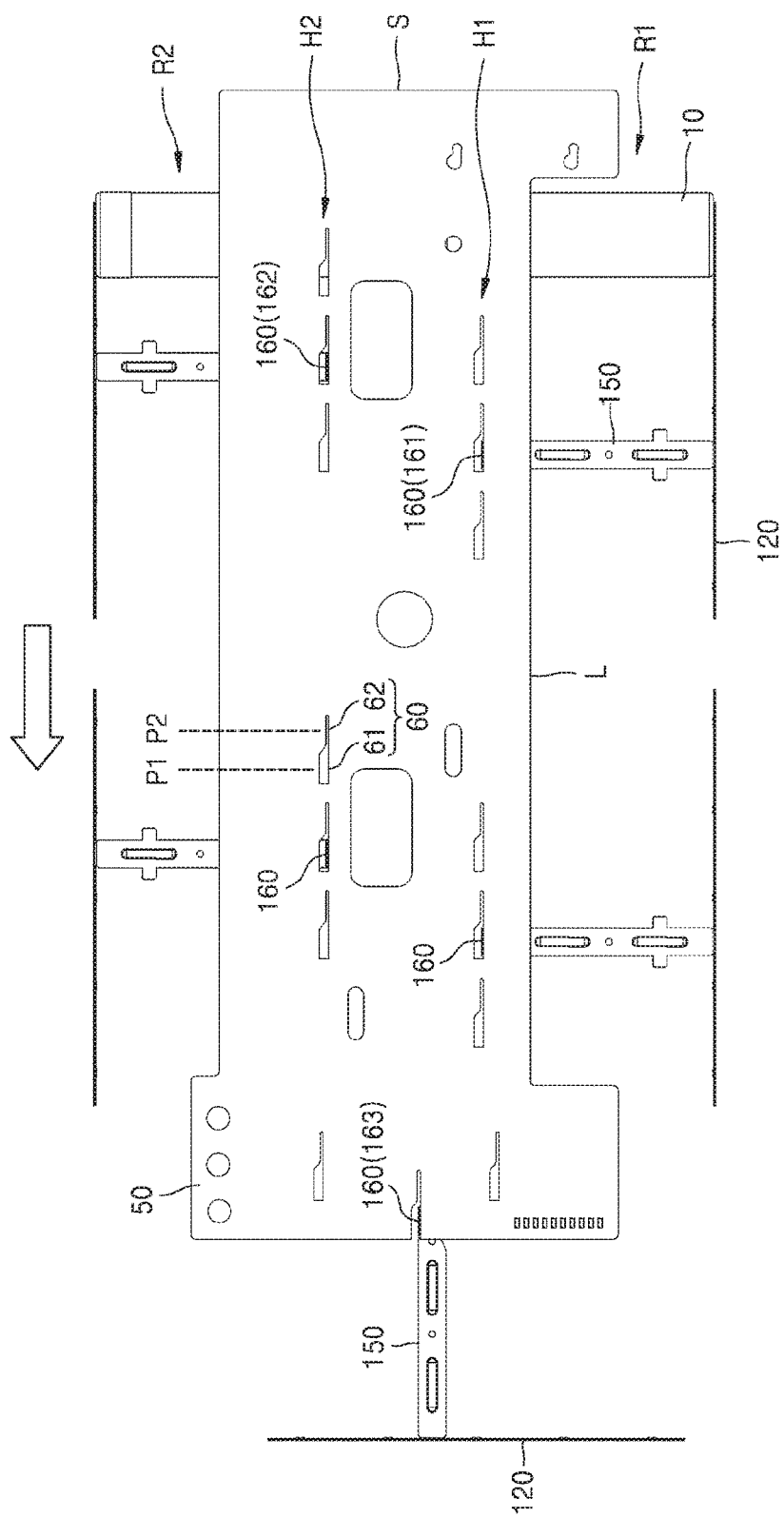
FIGS. 4 and 5 are plan views for explaining connection of connection tabs to a circuit board.
Figure 5:
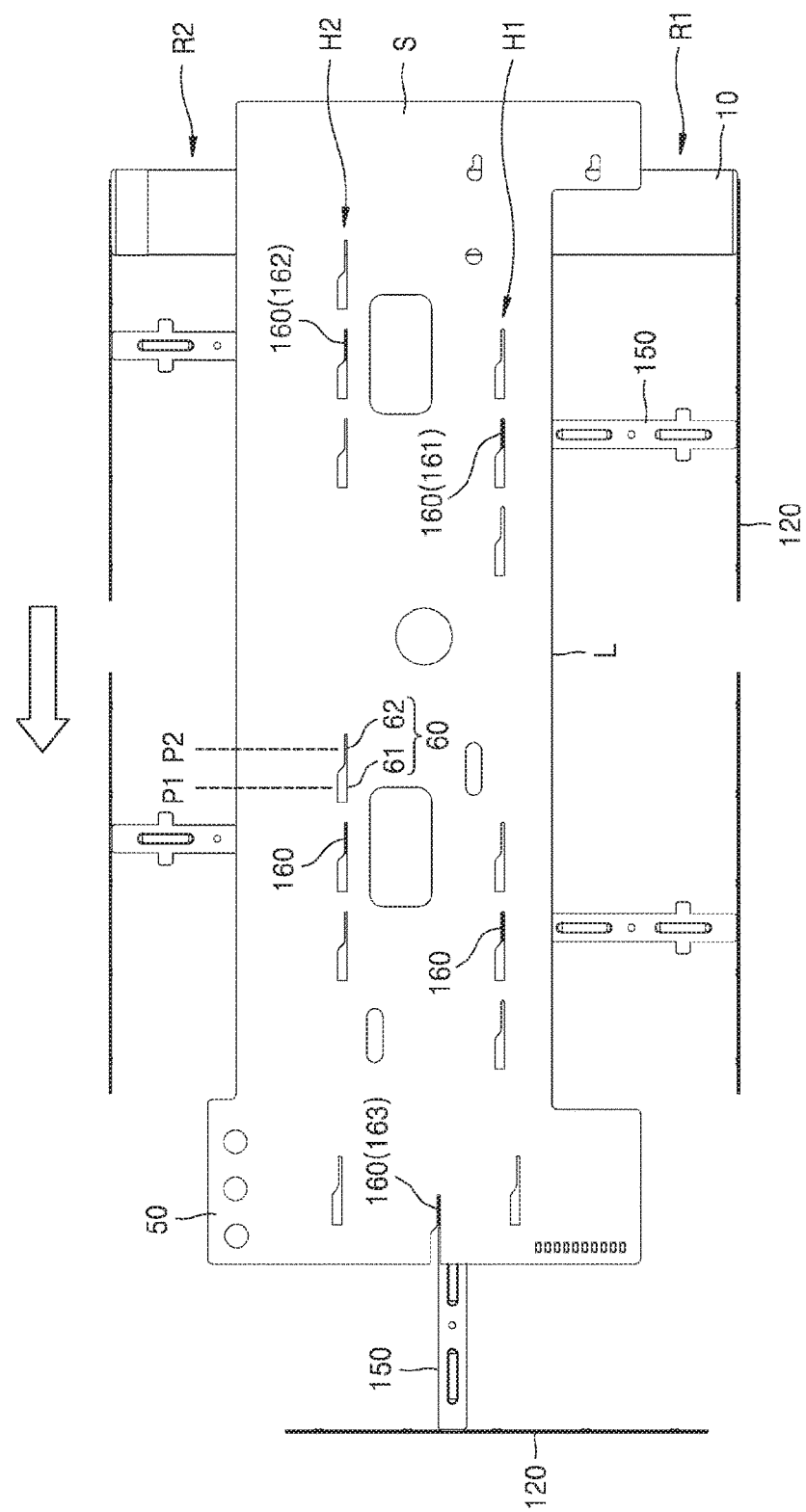

FIGS. 4 and 5 are plan views for explaining connection of the connection tabs 160 to the circuit board 50.

Referring to FIGS. 4 and 5, the connection holes 60 into which the connection tabs 160 are inserted are formed in the circuit board 50. In this case, the connection holes 60 can include the first connection holes 61 formed at first positions P1 and the second connection holes 62 formed at second positions P2. The connection tabs 160 are inserted into the first connection holes 61 at the first positions P1, and move to the second connection holes 62 as the circuit board 50 slides. The connection tabs 160 and the second connection holes 62 can be soldered, and the connection tabs 160 can be fixed. For example, the connection tabs 160 are inserted into the first connection holes 61 having relatively large widths at the first positions P1, and as the circuit board 50 slides, the connection tabs 160 move to the second connection holes 62 having relatively small widths at the second positions P2. Due to the sliding of the circuit board 50, the connection tabs 160 can be easily inserted into the first connection holes 61 having relatively large widths, and then can move to the second connection holes 62 having relatively small widths to be firmly fixed.

The battery pack according to an exemplary embodiment can include the battery cells 10, and needs connection of a plurality of the connection tabs 160 in order to obtain state information of the battery cells 10. In this case, in order to connect the connection tabs 160 at one time, the first and second connection holes 61 and 62 having different widths can be formed at the first and second positions P1 and P2 that are different from each other in the circuit board 50. As the circuit board 50 slides, the connection tabs 160 inserted into the larger first connection holes 61 can be fixed to the smaller second connection holes 62. Since the connection tabs 160 are inserted into the first connection holes 61 at one time without being separately inserted into the connection holes 60 and then the connection tabs 160 are firmly inserted into the second connection holes 62 as the circuit board 50 slides, the connection tabs 160 can be connected at one time, and the connection tabs 160 can be inserted into the connection holes 60 through one insertion of the connection tabs 160 and one sliding of the circuit board 50. Next, since the connection tabs 160 and the connection pads around the second connection holes 62 are soldered, electrical connection between the connection pads and the connection tabs 160 can be completed.

The circuit board 50 can be supported by the connection tabs 160. For example, the circuit board 50 is stably fixed by the connection tabs 160 fixed into the connection holes 60 in the first and second rows R1 and R2. In this case, since the circuit board 50 is disposed at a central position of the battery cells 10 in the first and second rows R1 and R2, the circuit board 50 can be better supported and be more stable. For example, the circuit board 50 is supported by the connection tabs 160 that are drawn out to a central position of the battery cells 10 in the first and second rows R1 and R2. In this case, the first connection tabs 161 connected to the battery cells 10 in the first row R1 and the second connection tabs 162 connected to the battery cells 10 in the second row R2 can support the circuit board 50 at near positions. That is, since the first and second connection tabs 161 and 162 support the circuit board 50 in a state where the first and second connection tabs 161 and 162 are adjacent to each other, even when there is a height difference between the first and second connection tabs 161 and 162, the circuit board 50 can be stably fixed.

If the first and second connection tabs 161 and 162 support the circuit board 50 in a state where the first and second connection tabs 161 and 162 are far from each other, the circuit board 50 can be inclined to one side due to a height difference between the first and second connection tabs 161 and 162, and electrical connection lengths of the connection tabs 160 can be different from one another, the circuit board 50 can be inclined, and the circuit board 50 may not be stably supported.

Figure 6:
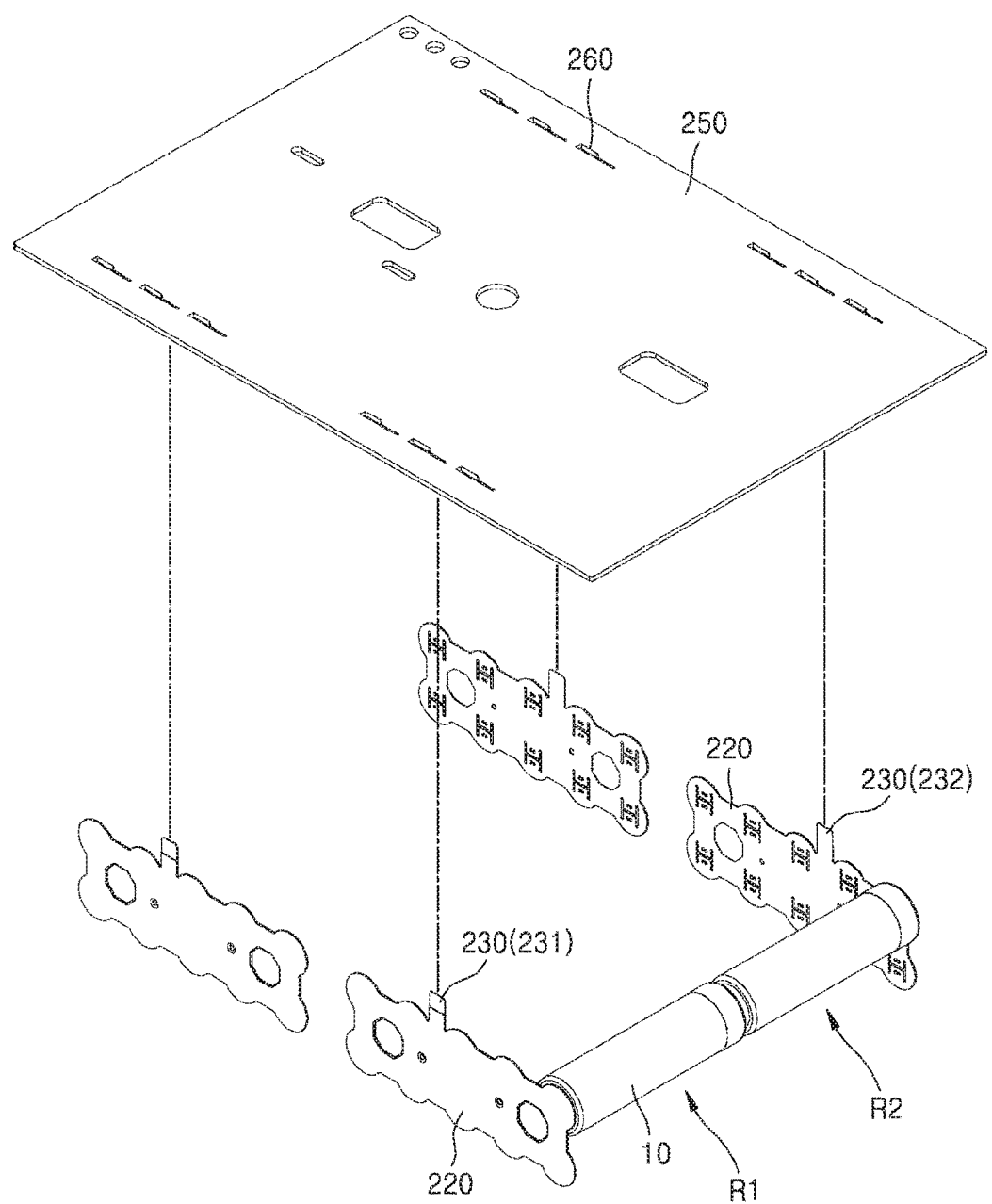
FIG. 6 is an exploded perspective view of a connection structure of connection tabs according to a comparative example, contrasted with the described technology.

FIG. 6 is an exploded perspective view of a connection structure of connection tabs 230 according to a comparative example, contrasted with the described technology.

Referring to FIG. 6, the connection tabs 230 electrically connected to the battery cells 10 in the first and second rows R1 and R2 extend upward from link members 220 and are inserted into connection holes 260 of a circuit board 250. A connection position between the connection tabs 230 and the circuit board 250 is an edge position, instead of a central position, in a facing direction in which the battery cells 10 in the first and second rows R1 and R2 face each other. The circuit board 250 is supported from first and second connection tabs 231 and 232 that are far from each other. In this case, due to a height difference between the first and second connection tabs 231 and 232, the circuit board 250 can be greatly inclined.

In the exemplary embodiment of FIG. 3, since the first and second connection tabs 161 and 162 are close to each other, an inclination angle by which the circuit board 50 is inclined due to a height difference between the first and second connection tabs 161 and 162 is small. As an inclination angle of the circuit board 50 decreases, connection lengths of the connection tabs 160 inserted into the circuit board 50 can be more similar to one another and thus the connection tabs 160 can be more smoothly connected. Also, as an inclination angle of the circuit board 50 decreases, the circuit board 50 can be more stably supported, thereby, for example, being prevented from being damaged due to an external impact.

The battery pack according to an exemplary embodiment can include the battery cells 10 in the first and second rows R1 and R2 that face each other. When the battery cells 10 in the first and second rows R1 and R2 face each other, it can mean that the battery cells 10 in the first and second rows R1 and R2 extend in parallel in one direction. The connection tabs 160 are drawn out from the connection members 150 connected to the battery cells 10 in the first and second rows R1 and R2 to a central position in the longitudinal direction of the battery cells 10 in the first and second rows R1 and R2. The circuit board 50 can be disposed at the central position in the longitudinal direction of the battery cells 10 in the first and second rows R1 and R2, and the connection tabs 160 drawn out to the central position can be inserted into the circuit board 50. In this case, the connection tabs 160 can be connected at one time through insertion and sliding of the circuit board 50.

The battery pack can further include the battery cells 10 in the third row R3 that are arranged in a direction different from the facing direction of the battery cells 10 in the first and second rows R1 and R2. For example, the battery cells 10 in the first and second rows R1 and R2 are arranged to have the facing direction as the longitudinal direction of the battery cells in the first and second rows R1 and R2. In this case, the battery cells 10 in the third row R3 can be arranged to have a direction perpendicular to (or crossing) the longitudinal direction of the battery cells in the first and second rows R1 and R2 as a longitudinal direction of the battery cells 10 in the third row R3. The battery cells 10 in the third row R3 can be electrically connected to the battery cells 10 in the first and second rows R1 and R2 and can be connected to the circuit board 50 along with the battery cells 10 in the first and second rows R1 and R2, in order to increase an output of the battery pack. For example, the battery cells 10 in the third row R3 are electrically connected to the battery cells 10 in the first and second rows R1 and R2 through the link members 120, and are connected to the circuit board 50 through the connection tabs 160 on one ends of the link members 120.

The circuit board 50 can be connected to the first and second connection tabs 161 and 162 connected to the battery cells 10 in the first and second rows R1 and R2, and can also be connected to third connection tabs 163 connected to the battery cells 10 in the third row R3. For example, the circuit board 50 is supported by the first and second connection tabs 161 and 162, and can also be supported by the third connection tabs 163.

The third connection tabs 163 can be connected in substantially the same manner as that used to connect the first and second connection tabs 161 and 162. That is, the third connection tabs 163 are inserted into the first and second connection holes 61 and 62 having different widths at the first and second positions P1 and P2 that are different from each other in the circuit board 50. For example, the third connection tabs 163 can be inserted into the first connection holes 61 having relatively large widths, and then as the circuit board 50 slides, can the stably fixed to the second connection holes 62 having relatively small widths. The third connection tabs 163 can be inserted into the first connection holes 61 of the circuit board 50 at one time along with the first and second connection tabs 161 and 162, and as the circuit board 50 slides, can move to the second connection holes 62 to be soldered to the connection pads.

The connection holes 60 can include the connection holes 60 into which the first and second connection tabs 161 and 162 electrically connected to the battery cells 10 in the first and second rows R1 and R2 that are arranged to have a facing direction as a longitudinal direction are inserted, and the connection holes 60 into which the third connection tabs 163 electrically connected to the battery cells 10 in the third row R3 that are arranged to have a direction different from the facing direction as a longitudinal direction are inserted. In this case, the connection holes 60 related to the battery cells 10 in the first through third rows R1, R2, and R3 can include the first and second connection holes 61 and 62 having different widths and connected to each other in one direction.

The connection holes 60 can include the first and second connection holes 61 and 62 arranged in one direction, and can be formed as long holes extending in the one direction. The one direction can correspond to a sliding direction in which the circuit board 50 slides. As the circuit board 50 slides, the connection tabs 160 can move from the first connection holes 61 to the second connection holes 62. For example, the one direction corresponds to a direction parallel to long sides L of the circuit board 50. For example, when the circuit board 50 has a substantially rectangular shape including one pair of long sides L and one pair of short sides S, the one direction of the connection holes 60 can be a direction parallel to the long sides L of the circuit board 50.

The connection holes 60 related to the battery cells 10 in the first through third rows R1, R2, and R3 can have substantially the same structure. When the connection holes 60 related to the battery cells 10 in the third through third rows R1, R2, and R3 have substantially the same structure, it means that as the circuit board 50 slides, the first through third connection tabs 161, 162, and 163 move from the first connection holes 61 to the second connection holes 62. That is, as the circuit board 50 slides, the first through third connection tabs 161, 162, and 163 collectively move from the first connection holes 61 to the second connection holes 62.

According to at least one of the disclosed embodiments, a battery pack that can easily connect connection tabs for electrically connecting battery cells and a circuit board can be provided. For example, connection tabs are connected at one time, and are easily inserted and fixed through first and second connection holes that are parallel to a sliding direction in which the circuit board slides and have different sizes.

According to at least one of the disclosed embodiments, since first and second connection tabs electrically connected to battery cells in first and second rows are connected to the circuit board in a state where the first and second connection tabs are close to each other, even when there is a height difference between the first and second connection tabs within an allowable tolerance, the connection tabs can be connected and the circuit board can be stably supported.

While the inventive technology has been described with reference to the figures, it will be understood by those of ordinary skill in the art that various changes in form and details can be made therein without departing from the spirit and scope as defined by the following claims.

What is claimed is:
1. A battery pack comprising:
a plurality of battery cells;
a plurality of connection tabs electrically connected to the battery cells; and
a circuit board having a plurality of connection holes respectively configured to receive the connection tabs, wherein the connection holes comprise a plurality of first connection holes formed at first positions and each having a first width and a plurality of second connection holes integrally formed with the first connection holes at second positions and each having a second width less than the first width, and wherein the connection tabs are configured to move from the first connection holes formed at the first positions to the second connection holes formed at the second positions.

2. The battery pack of claim 1, wherein the battery cells comprise battery cells in first and second rows that are arranged to have a facing direction in which the battery cells in the first and second rows face each other as a longitudinal direction.

3. The battery pack of claim 1, wherein the circuit board is disposed at a central position in a facing direction in which battery cells in first and second rows face each other.

4. The battery pack of claim 1, wherein the connection tabs are formed at a central position in a facing direction in which battery cells in first and second rows face each other.

5. The battery pack of claim 4, wherein the connection tabs are arranged closer to electrodes of the battery cells that face each other than electrodes of the battery cells that do not face each other.

6. The battery pack of claim 1, further comprising a plurality of connection members connected to the connection tabs and electrically connected to the battery cells, wherein the connection tabs are bent upward from the connection members.

7. The battery pack of claim 1, further comprising a plurality of connection pads formed around the second connection holes.

8. The battery pack of claim 1, wherein the battery cells comprise:
a plurality of first battery cells in a first row and a plurality of second battery cells in a second row, wherein the first battery cells face the second battery cells; and
a plurality of third battery cells in a third row arranged in a direction crossing the direction in which the first and second battery cells are arranged.

9. The battery pack of claim 8, wherein the circuit board is configured to slide, wherein the connection tabs comprise first through third connection tabs electrically connected to the battery cells in the first through third rows, wherein the first through third connection tabs are configured to move from the first connection holes to the second connection holes as the circuit board slides.

10. A battery pack comprising:
a plurality of battery cells in first and second rows arranged to face each other;
a circuit board configured to obtain state information from the battery cells; and
a plurality of connection tabs electrically connected to the battery cells in the first and second rows and inserted into the circuit board, wherein the connection tabs are formed closer to the center of the rows of batteries than edges of the rows of batteries,
wherein the circuit board has a plurality of connection holes into which the connection tabs are inserted, and wherein the connection holes comprise a plurality of first connection holes formed at first positions and each having a first width and a plurality of second connection holes integrally formed with the first connection holes at second positions and having a second width that is less than the first width, and wherein the connection tabs are configured to move from the first connection holes formed at the first positions to the second connection holes formed at the second positions.

11. The battery pack of claim 10, wherein the connection tabs are arranged closer to electrodes of the battery cells that face each other than electrodes of the battery cells that do not face each other.

12. The battery pack of claim 10, further comprising a plurality of connection members connected to the connection tabs and electrically connected to the battery cells, wherein the connection tabs are bent upward from the connection members.

13. The battery pack of claim 10, wherein the circuit board is disposed at a central position in the facing direction of the battery cells in the first and second rows.

14. The battery pack of claim 10, further comprising a plurality of connection pads formed around the second connection holes.

15. The battery pack of claim 10, further comprising a plurality of battery cells in a third row arranged in a direction crossing the direction in which the first and second battery cells are arranged.

16. A battery pack comprising:
a plurality of battery cells arranged in first to third groups, wherein the battery cells of the first and second groups extend in a first direction, and wherein the battery cells of the third group extend in a second direction crossing the first direction;
a plurality of connection tabs electrically connected to the battery cells; and
a circuit board having a plurality of connection holes and placed over the first to third groups of the battery cells; wherein the connection holes are substantially linear and extend in the second direction, wherein the connection tabs are inserted into the connection holes, and wherein at least two of the connection holes have different widths,
wherein the connection holes comprise a plurality of first connection holes formed at first positions and each having a first width and a plurality of second connection holes integrally formed with the first connection holes at second positions and each having a second width less than the first width, and wherein the connection tabs are configured to move from the first connection holes formed at the first positions to the second connection holes formed at the second positions.

17. The battery pack of claim 16, wherein the battery cells of the first and second groups respectively comprise a plurality of first electrodes and a plurality of second electrodes, wherein the first electrodes face the second electrodes, wherein the battery cells of the first and second groups respectively comprise a plurality of third electrodes and a plurality of fourth electrodes, wherein the third and fourth electrodes do not face each other, and wherein the connection tabs are located closer to the first and second electrodes than the third and fourth electrodes.

18. The battery pack of claim 1, wherein the first and second widths are measured in a width direction of the circuit board, and wherein the connection tabs are configured to overlap only the second holes in the width direction, when the second connection tabs are placed in the second positions.

19. The battery pack of claim 18, wherein the connection tabs are in direct physical contact with inner walls of the second connection holes, when the second connection tabs are placed in the second positions.

20. The battery pack of claim 1, wherein the connection tabs are configured to move in a lengthwise direction of the circuit board.

* * * * *